(12) United States Patent
Wang et al.

(10) Patent No.: US 12,672,056 B2
(45) Date of Patent: Jun. 30, 2026

(54) RESOURCE SELECTION METHOD AND APPARATUS, AND ELECTRONIC DEVICE

(71) Applicant: VIVO MOBILE COMMUNICATION CO., LTD., Dongguan (CN)

(72) Inventors: Huan Wang, Dongguan (CN); Zichao Ji, Dongguan (CN); Shuyan Peng, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 479 days.

(21) Appl. No.: 18/114,964

(22) Filed: Feb. 27, 2023

(65) Prior Publication Data

US 2023/0209457 A1 Jun. 29, 2023

Related U.S. Application Data

(63) Continuation of application No. PCT/CN2021/114273, filed on Aug. 24, 2021.

(30) Foreign Application Priority Data

Aug. 28, 2020 (CN) .......................... 202010890054.5

(51) Int. Cl.
H04W 48/20 (2009.01)
H04W 48/16 (2009.01)
H04W 72/25 (2023.01)

(52) U.S. Cl.
CPC ........... *H04W 48/20* (2013.01); *H04W 48/16* (2013.01); *H04W 72/25* (2023.01)

(58) Field of Classification Search
None
See application file for complete search history.

(56) References Cited

U.S. PATENT DOCUMENTS 12,323,949 B2 * 6/2025 Di Girolamo ........ H04W 76/14
2018/0295646 A1 * 10/2018 Faurie ................... H04W 72/23
(Continued)

FOREIGN PATENT DOCUMENTS

CN 111436033 A 7/2020
CN 112385251 A 2/2021

OTHER PUBLICATIONS

International Search Report issued in corresponding International Application No. PCT/CN2021/114273, mailed Nov. 11, 2021, 4 pages.

(Continued)

*Primary Examiner* — Hong S Cho
(74) *Attorney, Agent, or Firm* — IPX PLLC

(57) ABSTRACT

A resource selection method and apparatus, and an electronic device are provided. The resource selection method includes: obtaining, by a transmit user equipment, assistance information of another node, where performing, by the transmit user equipment, resource selection based on at least the assistance information includes any one of the following: determining, by the transmit user equipment, a candidate resource set based on a resource sensing result and/or the assistance information, and performing resource selection based on the candidate resource set and/or the assistance information; obtaining or creating, by the transmit user equipment, at least one sidelink grant based on the assistance information, where the sidelink grant includes one or a group of sidelink transmission resources; and performing, by the transmit user equipment, resource selection based on at least one piece of the assistance information.

20 Claims, 5 Drawing Sheets

A transmit user equipment obtains assistance information of another node — 101 performing, by the transmit user equipment, resource selection based on at least the assistance information includes any one of the following:
determining, by the transmit user equipment, a candidate resource set based on a resource sensing result and/or the assistance information, and performing resource selection based on the candidate resource set and/or the assistance information;
obtaining or creating, by the transmit user equipment, at least one sidelink grant based on the assistance information, where the sidelink grant includes one or a group of sidelink transmission resources; and
performing, by the transmit user equipment, resource selection based on at least one piece of the assistance information — 102

(56)                    References Cited

U.S. PATENT DOCUMENTS

| | | | |
|---|---|---|---|
| 2020/0128562 A1* | 4/2020 | Hou | H04B 17/318 |
| 2020/0229171 A1 | 7/2020 | Khoryaev et al. | |
| 2021/0306828 A1* | 9/2021 | Panteleev | H04W 72/0446 |
| 2023/0292347 A1* | 9/2023 | Salim | H04L 5/0044 |
| 2024/0163874 A1* | 5/2024 | Farag | H04W 76/14 |

OTHER PUBLICATIONS

Fraunhofer Hhi et al., "Resource Allocation Enhancements for Mode 2", 3GPP TSG RAN WG1 Meeting #102-e R1-2005537, Aug. 2020, 8 pages.
Interdigital, Inc., "NR SL Mode 2 Enhancement for Reliability Improvement", 3GPP TSG RAN WG1 #102-e R1-2006184, Aug. 2020, 3 pages.

* cited by examiner

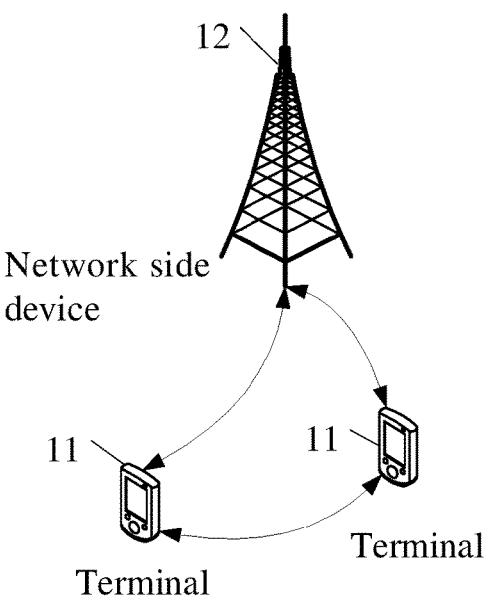
Network side device
11
11
Terminal
Terminal
FIG. 1
Notify the assistance information
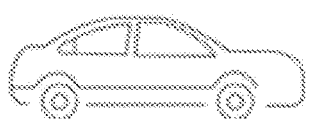
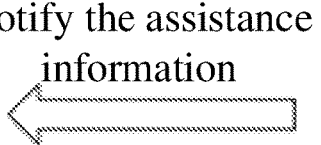
UE-B: Select a resource based on the assistance information
UE-A: Determine assistance information
FIG. 2

Figure 3:
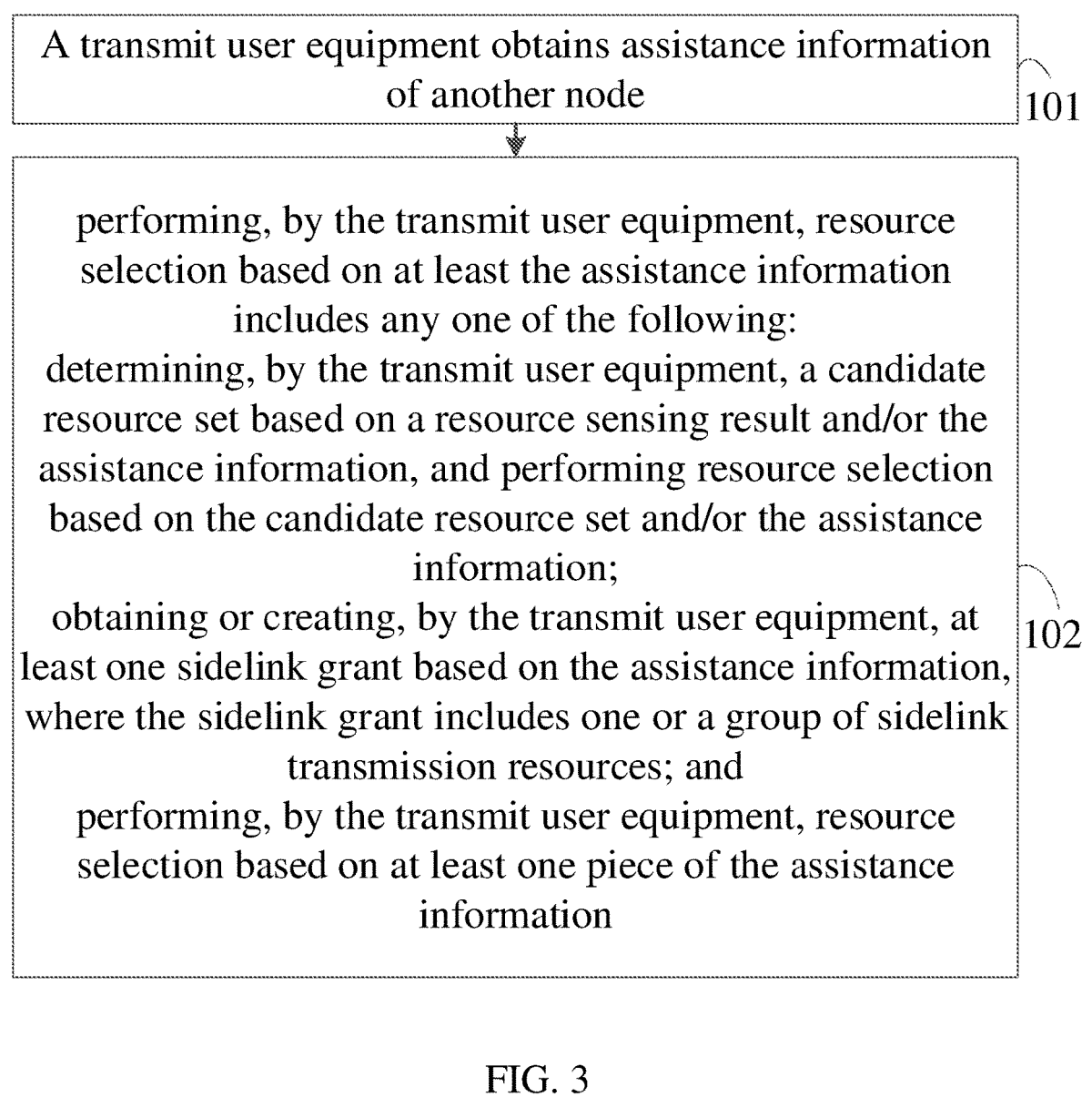

A transmit user equipment obtains assistance information of another node

101 performing, by the transmit user equipment, resource selection based on at least the assistance information includes any one of the following:

determining, by the transmit user equipment, a candidate resource set based on a resource sensing result and/or the assistance information, and performing resource selection based on the candidate resource set and/or the assistance information;

obtaining or creating, by the transmit user equipment, at least one sidelink grant based on the assistance information, where the sidelink grant includes one or a group of sidelink transmission resources; and performing, by the transmit user equipment, resource selection based on at least one piece of the assistance information

102

FIG. 3 resource set notified by pair-UE resource set notified by group-UEs resource set notified by proximity-UEs

RESOURCE SELECTION METHOD AND APPARATUS, AND ELECTRONIC DEVICE

CROSS-REFERENCE TO RELATED APPLICATIONS

This application is a continuation of International Application No. PCT/CN2021/114273, filed on Aug. 24, 2021, which claims priority to Chinese Patent Application No. 202010890054.5, filed on Aug. 28, 2020. The entire contents of each of the above-identified applications are expressly incorporated herein by reference.

TECHNICAL FIELD

This application relates to the field of communications technologies, and in particular, to a resource selection method and apparatus, and an electronic device.

BACKGROUND

Due to hardware constraints and scenario limitation, reliability of sidelink transmission is relatively low. To improve the reliability of the sidelink transmission, some assistance information may be suggested to a Transmit User Equipment (TX UE), to assist the TX UE in resource selection and/or adjustment of a transmission parameter of the TX UE. However, how the TX UE uses the assistance information to perform resource selection is still a problem to be solved.

SUMMARY

Embodiments of this application provide a resource selection method and apparatus, and an electronic device.

According to a first aspect, an embodiment of this application provides a resource selection method, including:

obtaining, by a transmit user equipment, assistance information of another node, where performing, by the transmit user equipment, resource selection based on at least the assistance information includes any one of the following:

determining, by the transmit user equipment, a candidate resource set based on a resource sensing result and/or the assistance information, and performing resource selection based on the candidate resource set and/or the assistance information;

obtaining or creating, by the transmit user equipment, at least one sidelink grant based on the assistance information, where the sidelink grant includes one or a group of sidelink transmission resources; and performing, by the transmit user equipment, resource selection based on at least one piece of the assistance information.

According to a second aspect, an embodiment of this application provides a resource selection apparatus, including:

an obtaining module, configured to obtain assistance information of another node; and a processing module, configured to perform resource selection based on at least the assistance information, including any one of the following:

determining a candidate resource set based on a resource sensing result and/or the assistance information, and performing resource selection based on the candidate resource set and/or the assistance information;

obtaining or creating at least one sidelink grant based on the assistance information, where the sidelink grant includes one or a group of sidelink transmission resources; and performing resource selection based on at least one piece of the assistance information.

According to a third aspect, an embodiment of this application further provides an electronic device, including a processor, a memory, and a program or an instruction stored in the memory and executable on the processor, where when the program or the instruction is executed by the processor, steps of the foregoing method are implemented.

According to a fourth aspect, an embodiment of this application provides a readable storage medium, where the readable storage medium stores a program or an instruction, and when the program or the instruction is executed by a processor, steps of the foregoing method are implemented.

According to a fifth aspect, an embodiment of this application provides a chip, where the chip includes a processor and a communications interface, the communications interface is coupled to the processor, and the processor is configured to run a program or an instruction, to implement the method according to the first aspect.

According to a sixth aspect, an embodiment of this application provides a computer software product, where the computer software product is stored in a non-volatile storage medium, and the software product is configured to be executed by at least one processor to implement steps of the method according to the first aspect.

According to a seventh aspect, an embodiment of this application provides an electronic device, where the electronic device is configured to perform the method according to the first aspect.

BRIEF DESCRIPTION OF DRAWINGS

To describe the embodiments of this application, the following describes the accompanying drawings required for describing the embodiments of this application. Apparently, the accompanying drawings in the following description show merely some embodiments of this application.

FIG. 1 is a schematic diagram of a wireless communications system;

FIG. 2 is a schematic diagram in which a UE-A notifies assistance information to a UE-B;

FIG. 3 is a schematic flowchart of a resource selection method according to an embodiment of this application;

DETAILED DESCRIPTION

Figure 4:
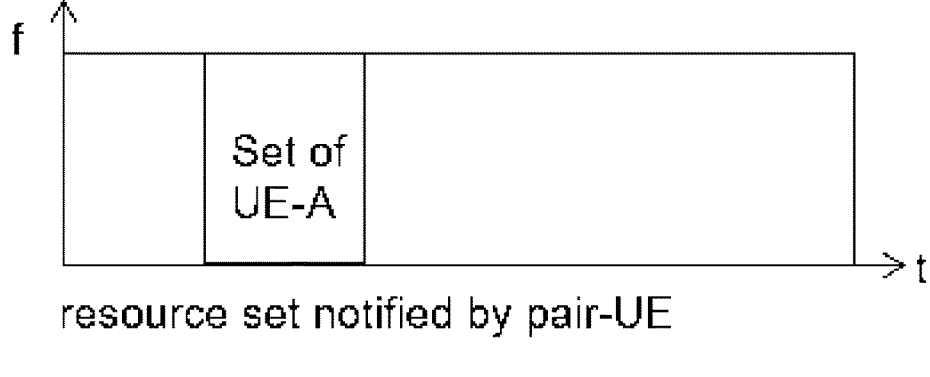
FIG. 4 to FIG. 6 are schematic diagrams of obtaining assistance information of different types of UEs according to an embodiment of this application.

The following describes the embodiments of this application with reference to the accompanying drawings in the embodiments of this application. Apparently, the described embodiments are some but not all of the embodiments of this application. All other embodiments obtained by a person of ordinary skill in the art based on the embodiments of this application without creative efforts shall fall within the protection scope of this application.

The terms "first," "second," and the like in this specification and claims of this application are used to distinguish between similar objects instead of describing a specific order or sequence. It should be understood that the data used in this way is interchangeable in appropriate circumstances so that the embodiments of this application described can be implemented in other orders than the order illustrated or described herein. In addition, in the specification and the claims, "and/or" represents at least one of connected objects, and a character "/" generally represents an "or" relationship between associated objects.

The technology described in this specification is not limited to a Long Term Evolution (LTE)/LTE-Advanced (LTE-A) system, and may also be used in various wireless communications systems such as Code Division Multiple Access (CDMA), Time Division Multiple Access (TDMA), Frequency Division Multiple Access (FDMA), Orthogonal Frequency Division Multiple Access (OFDMA), Single-carrier Frequency-Division Multiple Access (SC-FDMA), and another system. The terms "system" and "network" are often interchangeably used. A CDMA system may implement a radio technology such as CDMA2000 or Universal Terrestrial Radio Access (UTRA). UTRA includes Wideband CDMA (WCDMA) and other CDMA variants. The TDMA system can implement a radio technology such as Global System for Mobile communication (GSM). The OFDMA system can implement radio technologies such as Ultra Mobile Broadband (UMB), Evolved-UTRA (E-UTRA), IEEE 802.11 (Wi-Fi), IEEE 802.16 (WiMAX), IEEE 802.20, and Flash-OFDM. UTRA and E-UTRA are parts of the Universal Mobile Telecommunications System (UMTS). LTE and more advanced LTE (such as LTE-A) are new UMTS versions that use E-UTRA. UTRA, E-UTRA, UMTS, LTE, LTE-A, and GSM are described in the literature from an organization called 3rd Generation Partnership Project (3GPP). CDMA2000 and UMB are described in a document from an origination named "3rd Generation Partnership Project 2" (3GPP2). The technologies described in this specification may be used in the systems and radio technologies mentioned above, and may also be used in another system and radio technology. However, an NR system is described in the following description for illustrative purposes, and an NR terminology is used in most of the following description, although these technologies can also be applied to applications other than the NR system application.

The following description provides examples without limiting the scope, applicability, or configuration set forth in the claims. The functions and arrangements of the elements under discussion may be changed without departing from the spirit and scope of the present disclosure. In the examples, various procedures or components may be appropriately omitted, replaced, or added. For example, the described method may be performed in an order different from that described, and steps may be added, omitted, or combined. In addition, features described with reference to some examples may be combined in other examples.

Referring to FIG. 1, FIG. 1 is a block diagram of a wireless communications system to which embodiments of this application can be applied. The wireless communications system includes a terminal 11 and a network side device 12. The terminal 11 may be alternatively referred to as a terminal device or User Equipment (UE). The terminal 11 may be a terminal side device such as a mobile phone, a tablet personal computer, a laptop computer, a Personal Digital Assistant (PDA), a Mobile Internet Device (MID), a wearable device, or an in-vehicle device. It should be noted that a specific type of the terminal 11 is not limited in this embodiment of this application. The network side device 12 may be a base station or a core network, where the base station may be a 5th Generation (5G) base station or a base station (such as a gNB, a 5G NR NB, or the like) of a later version, or a base station in another communications system (such as an evolved Node B (eNB), a Wireless Local Area Network (WLAN) access point, or another access point), or may be a location server (such as an Evolved Serving Mobile Location Centre (E-SMLC)) or a Location Manager Function (LMF)), and the base station may be referred to as a NodeB, an evolved NodeB, an access point, a Base Transceiver Station (BTS), a radio base station, a radio transceiver, a Basic Service Set (BSS), an Extended Service Set (ESS), a NodeB, an eNB, a home NodeB, a home evolved NodeB, a WLAN access point, a Wireless Fidelity (WiFi) node, or another appropriate term in the field. It should be noted that, in the embodiments of this application, only a base station in an NR system is used as an example, but a specific type of the base station and a specific communications system are not limited in the embodiments of this application.

There are two resource allocation modes in the New Radio (NR) SideLink (SL), one is a resource allocation mode based on base station scheduling (mode 1), and the other is a resource allocation mode based on autonomous resource selection of User Equipment (UE) (mode 2). With regard to the resource allocation mode based on base station scheduling, a sidelink resource used by the UE for data transmission is determined by the base station, and TX UE is notified by downlink signaling; with regard to the resource allocation mode based on autonomous resource selection of UE, the UE selects an available transmission resource from a (pre-) configured resource pool, and before resource selection, the UE performs channel sensing, selects a resource set with less interference based on a channel sensing result, and then randomly selects a resource for transmission from the resource set.

A specific working manner in mode 2 is as follows.

1) After resource selection is triggered, the TX UE first determines a resource selection window. A lower boundary of the resource selection window is at a T1 time after the resource selection is triggered, and an upper boundary of the resource selection window is at a T2 time after the resource selection is triggered.

T2 is a value selected by the UE in a Packet Delay Budget (PDB) transmitted in a Transport Block (TB) of the UE, and T2 is not earlier than T1.

2) Before resource selection, the UE needs to determine a candidate resource set for resource selection, and compare a Reference Signal Received Power (RSRP) measurement value on a resource in the resource selection window with a corresponding RSRP threshold, (the RSRP and the RSRP threshold are not directly measured on the resource in the resource selection window, but are determined based on the sensing result), and if the RSRP is greater than the RSRP threshold, the resource will be excluded and cannot be included in the candidate resource set. After resource exclusion, remaining resources in the resource selection window form the candidate resource set.

Resources in the candidate resource set account for at least 20% of resources in the resource selection window. If the resources in the candidate resource set account for less than x % (for example, x=20/40/60) of the resources in the resource selection window, the RSRP threshold needs to be increased based on a step-by-step value (3 dB), and then the resource exclusion is performed until no less than X % of the resources can be selected.

3) After the candidate resource set is determined, the UE randomly selects a transmission resource in the candidate resource set. In addition, the UE can reserve a transmission resource for a next transmission in this transmission.

The sidelink transmission includes at least the following scenarios:

Scenario 1: Due to the limitation on half-duplex, a receive user equipment (RX UE) cannot perform sending and receiving simultaneously. The RX UE suggests a resource set to the TX UE (for example, the RX UE will perform receiving operations on these resource sets) to assist the TX UE in resource selection, which can improve transmission reliability between this pair of UEs.

Scenario 2: Due to a defect in resource selection in mode 2, resource selection performed by different TX UEs may conflict with each other. The defect is caused by at least inaccuracy of resource sensing (for example, inconsistent channel sensing results from the TX UE and the RX UE side) and randomness of resource selection during resource selection in mode 2.

Scenario 3: When the RX UE receives transmission of at least two Physical Sidelink Control CHannels (PSCCH) from the TX UE and feeds back Physical Sidelink Feedback CHannels (PSFCH) for the transmission of at least two PSCCHs, if the PSFCHs corresponding to the transmission of the PSCCHs fall in a same PSFCH occasion, due to limitation on UE capability and/or power control, at least two PSFCHs cannot be sent simultaneously, so that transmission reliability cannot be ensured.

To improve the reliability of the sidelink transmission, some assistance information may be suggested to a transmit user equipment (TX UE), to assist the TX UE in resource selection and/or adjustment of a transmission parameter of the TX UE.

For example, as shown in FIG. 2, a UE-A determines a resource set, and the UE-A notifies a UE-B of the resource set, and the UE-B may consider, when performing resource selection in mode 2, the resource set notified by the UE-A. The resource set is a type of assistance information.

In conclusion, the resource selection in NR SL mode 2 has the defect of relatively low reliability, especially in a low delay transmission scenario. Because of the limited number of alternative resources, the reliability of resource selection in mode 2 may be lower. Sending assistance information to the TX UE can improve the reliability of resource selection in mode 2. However, how the TX UE uses the assistance information to perform resource selection is still a problem to be solved.

An embodiment of this application provides a resource selection method, as shown in FIG. 3, and the method includes the following steps.

Step 101: A transmit user equipment obtains assistance information of another node; and performing, by the transmit user equipment, resource selection based on at least the assistance information includes any one of the following:

determining, by the transmit user equipment, a candidate resource set based on a resource sensing result and/or the assistance information, and performing resource selection based on the candidate resource set and/or the assistance information;

obtaining or creating, by the transmit user equipment, at least one sidelink grant based on the assistance information, where the sidelink grant includes one or a group of sidelink transmission resources; and performing, by the transmit user equipment, resource selection based on at least one piece of the assistance information.

In the embodiments of this application, the transmit user equipment obtains the assistance information of another node and uses the assistance information to perform resource selection, so that the transmit user equipment can perform resource selection reasonably, and both low delay and high reliability requirements are satisfied to ensure higher reliability of sidelink transmission.

Other nodes include a control node and another UE.

When the transmit user equipment determines the candidate resource set based on only the resource sensing result, the transmit user equipment needs to combine the candidate resource set with the assistance information to perform resource selection, that is, the transmit user equipment needs to perform resource selection based on the assistance information.

In some embodiments, the assistance information includes at least one of the following:

an assistance resource set, including a first resource set and/or a second resource set, where the first resource set includes all time-frequency resources in a given time window and/or a frequency domain range, and the second resource set includes several time domain and/or frequency domain resources in a given time window and/or a frequency domain range, such as a partially concentrated and/or discretely distributed resource of resources in a time window and/or a frequency domain range, and a bitmap or other indication information may be used to indicate which resources in a time window and/or a frequency domain range belong to the second resource set. A granularity of the time domain and/or frequency domain resource may be specified by a protocol or configured by a control node or pre-configured by a control node or autonomously determined by UE or notified by another UE, and the time window and/or the frequency domain range may be related to a resource selection window of the receive user equipment or the transmit user equipment, or related to a resource sensing window of the receive user equipment or the transmit user equipment, or may be a window obtained based on a rule specified in a protocol or configured by a control node, or may be a window notified by other nodes, and the like;

a resource-related measurement parameter, including at least one of the following: a maximum value of measurement parameter values measured on resources of a first resource set; a maximum value of measurement parameter values measured on resources of a second resource set; a minimum value of measurement parameter values measured on resources of a first resource set, a minimum value of measurement parameter values measured on resources of a second resource set; an average value of measurement parameter values measured on resources of a first resource set; an average value of measurement parameter values measured on resources of a second resource set; a maximum value of measurement parameter values measured on all resources other than resources of the first resource set in a preset resource set; a maximum value of measurement parameter values measured on all resources other than resources of the second resource set in a preset resource set; a minimum value of measurement parameter values measured on all resources other than resources of the first resource set in a preset resource set; a minimum value of measurement parameter values measured on all resources other than resources of the second resource set in a preset resource set; an average value of measurement parameter values measured on all resources other than resources of the first resource set in a preset resource set; an average value of measurement parameter values measured on all resources other than resources of the second resource set in a preset resource set; a measurement parameter value measured on each resource of the first resource set; a measurement parameter value measured on each resource of the second resource set; a measurement parameter value measured on each resource other than resources of the first resource set in a preset resource set; a measurement parameter value measured on each resource other than resources of the second resource set in a preset resource set, where the preset resource set may be configured by a control node or specified in a protocol or obtained based on a rule specified in a protocol, or may be resources in the time window and/or frequency domain range of the assistance resource set, for example, the preset resource set may be the first resource set. The measurement parameter value includes at least one the following: a Reference Signal Received Power (RSRP), Received Signal Strength Indication (RSSI), a Reference Signal Received Quality (RSRQ), a Signal to Interference plus Noise Ratio (SINR), and a Signal-to-Noise Ratio (SNR);

resource-related priority information, including at least one the following: a maximum value of priorities detected on resources of the first resource set; a maximum value of priorities detected on resources of the second resource set; a minimum value of priorities detected on resources of the first resource set; a minimum value of priorities detected on resources of the second resource set; an average value of priorities detected on resources of the first resource set; an average value of priorities detected on resources of the second resource set; a maximum value of priorities detected on all resources other than resources of the first resource set in a preset resource set; a maximum value of priorities detected on all resources other than resources of the second resource set in a preset resource set; a minimum value of priorities detected on all resources other than resources of the first resource set in a preset resource set; a minimum value of priorities detected on all resources other than resources of the second resource set in a preset resource set; an average value of priorities detected on all resources other than resources of the first resource set in a preset resource set; an average value of priorities detected on all resources other than resources of the second resource set in a preset resource set; a priority measured on each resource of the first resource set; a priority measured on each resource of the second resource set; a priority measured on each of resources other than resources of the first resource set in a preset resource set; and a priority measured on each of resources other than resources of the second resource set in a preset resource set; and a threshold value of a resource-related measurement parameter, where the threshold value is used to obtain a candidate resource set and/or a virtual candidate resource set of the receive user equipment and/or a resource set that tends to be used for signal reception.

In some embodiments, the assistance information further includes at least one of the following:

a source or a type of the assistance information. For example, if the assistance information is a sensing result of another UE, or an allocation result of scheduling UE, or an allocation result of a base station forwarded by another UE, the transmit user equipment may determine the reliability of the assistance information based on the type;

a timestamp of the assistance information;

a validity period of the assistance information;

location information of UE sending the assistance information. For example, if the TX UE of the assistance information is far from the TX UE, the assistance information is inaccurate, and the assistance information can be ignored;

a moving speed of UE sending the assistance information. For example, if a speed of the UE transmitting the assistance information is greater than a specific threshold value, the assistance information is inaccurate, and the TX UE may ignore the assistance information; and a moving direction of UE sending the assistance information. For example, the TX UE may give priority to assistance information from UE traveling in a same direction.

In some embodiments, the transmit user equipment may determine a candidate resource set based on the resource sensing result and the assistance information notified by another UE (such as the receive user equipment), and then select transmission resources from the candidate resource set.

In some embodiments, the determining, by the transmit user equipment, a candidate resource set based on a resource sensing result and/or the assistance information includes:

determining a resource-related measurement parameter value and/or a threshold value of a resource-related measurement parameter in a resource selection window by using a resource-related measurement parameter in the assistance information and/or a resource-related measurement parameter obtained based on a resource sensing result.

In an example, the determining a resource-related measurement parameter value and/or a threshold value of a resource-related measurement parameter in a resource selection window by using a resource-related measurement parameter in the assistance information and/or a resource-related measurement parameter obtained based on a resource sensing result includes:

determining a resource quality parameter value and/or a threshold value Y of a resource-related measurement parameter in the resource selection window by using any of the following formulas:

$$Y=a*Y1+b*Y2;$$

$$Y=\min(Y1,Y2); \text{ and}$$

$$Y=\max(Y1,Y2), \text{ where}$$

Y1 is a resource-related measurement parameter and/or a threshold value of a resource-related measurement parameter obtained based on a resource sensing result, Y2 is a resource-related measurement parameter and/or a threshold value of a resource-related measurement parameter in the assistance information, and a and b are values specified by a protocol or configured by a control node or pre-configured by a control node or indicated by another UE.

For example, when the TX UE performs resource selection, an RSRP measurement value of a resource in the resource selection window is adjusted, and the adjustment is performed based on the RSRP measurement result of the TX UE and RSRP values reported by another UE (such as the RX UE), for example, RSRP=a*RSRP1+b*RSRP2; for another example, RSRP=min (RSRP1, RSRP2) or max (RSRP1, RSRP2), where the RSRP is an adjusted RSRP, the RSRP1 is an RSRP value detected by the TX UE, and the RSRP2 is an RSRP value reported by another UE (such as the RX UE).

If some resources in the resource selection window have no corresponding reporting information, a related measurement parameter value on a corresponding resource is determined only based on the sensing result of the TX UE (namely, b=0), or a related measurement parameter on a corresponding resource is a value specified in a protocol or obtained based on a rule specified in a protocol or configured by a control node or pre-configured by a control node or indicated by another UE.

In a case that the resource-related measurement parameter in the assistance information is greater than a first preset threshold, a value of the resource-related measurement parameter in the assistance information is adjusted to a first preset value; and in a case that the resource-related measurement parameter in the assistance information is less than a second preset threshold, a value of the resource-related measurement parameter in the assistance information is adjusted to 0, where the first preset threshold, the second preset threshold, and the first preset value are values specified by a protocol or configured by a control node or pre-configured by a control node or indicated by another UE.

For example, if RSRP2 corresponding to some resources in the resource selection window is greater than an RSRP2 threshold1, the RSRP2 is adjusted to infinite (then the TX UE may not select this resource as the transmission resource). The RSRP2 threshold1 is a value specified in a protocol or obtained based on a rule specified in a protocol or configured by a control node or pre-configured by a control node or indicated by another UE. And/or, if the RSRP2 corresponding to some resources in the resource selection window is less than an RSRP2 threshold2, the RSRP2 is adjusted to 0. The RSRP2 may be an independent RSRP value on each resource reported by the UE, or an RSRP value representing a group of resources (such as a maximum value or a minimum value or an average value).

In some embodiments, the determining, by the transmit user equipment, a candidate resource set based on a resource sensing result and/or the assistance information includes:

determining a priority value of a resource in a resource selection window by using resource priority information in the assistance information and/or resource priority information obtained based on a resource sensing result.

In an example, the determining a priority value of a resource in a resource selection window by using resource priority information in the assistance information and/or resource priority information obtained based on a resource sensing result includes:

determining a priority value X of a resource in the resource selection window by using any of the following formulas:

$X=c*X1+d*X2;$ $X=\min(X1,X2);$ and $X=\max(X1,X2),$ where

X1 is the resource priority information obtained based on the resource sensing result, X2 is the resource priority information in the assistance information, and c and d are values specified by a protocol or configured by a control node or pre-configured by a control node or indicated by another UE.

That is, when the TX UE performs resource selection, a priority detection value of the resource in the resource selection window is adjusted, and priority information of detection of the TX UE and the priority information reported by another UE are used in the adjustment.

For example, Priority=c*Priority 1+d*Priority 2; for another example, Priority=min (Priority 1, Priority 2) or max (Priority 1, Priority 2), where Priority 1 is the priority information of detection of the TX UE, and the Priority 2 is the priority information reported by another UE.

If some resources in the resource selection window have no corresponding reporting information, priority information on a corresponding resource is determined only based on the sensing result of the TX UE (namely, d=0), or priority information on a corresponding resource is a value specified in a protocol or obtained based on a rule specified in a protocol or configured by a control node or pre-configured by a control node or indicated by another UE.

For example, in a case that the resource priority information in the assistance information is greater than a third preset threshold, a value of the resource priority information in the assistance information is adjusted to a second preset value; and in a case that the resource priority information in the assistance information is less than a fourth preset threshold, a value of the resource priority information in the assistance information is adjusted to 0, where the third preset threshold, the fourth preset threshold, and the second preset value are values specified by a protocol or configured by a control node or pre-configured by a control node or indicated by another UE.

In some embodiments, the TX UE may determine the candidate resource set based on the sensing result and/or the information reported by the RX UE, and then perform resource selection based on the resource set (namely, the assistance resource set) reported by the RX UE and the determined candidate resource set.

When the TX UE determines the candidate resource set, the prior art may be used to determine the candidate resource set, or the candidate resource set may also be determined based on the prior art and the information reported by the RX UE.

In some embodiments, the determining, by the transmit user equipment, a candidate resource set based on a resource sensing result and/or the assistance information includes:

determining a measurement value threshold of a candidate resource based on assistance information notified by a receive user equipment, and determining the candidate resource set based on the measurement value threshold.

The measurement value threshold includes the threshold value of the resource-related measurement parameter in the assistance information or is determined based on the assistance information.

For example, the TX UE determines RSRP_threshold3 based on the information reported by the RX UE, and determines the candidate resource set based on the RSRP threshold, where RSRP threshold3 may be an RSRP threshold value reported by the RX UE or may be obtained based on the information reported by the RX UE.

When the TX UE determines a transmission resource based on the determined candidate resource set and the assistance resource set reported by the RX UE, a probability of each candidate resource to be selected is determined based on the assistance resource set and the candidate resource set, where a first candidate resource has a first probability, and the first candidate resource is located in both the assistance resource set and the candidate resource set; a second candidate resource has a second probability, and the second candidate resource is located in the candidate resource set but not in the assistance resource set; a third candidate resource has a third probability, and the third candidate resource is located in the assistance resource set but not in the candidate resource set.

Some resources are resources that the TX UE tends to use, and some resources are resources that the RX UE side tends to use. In this way, both the TX UE and the RX UE can determine available resources, and the reliability of transmission on the selected resource is higher. The first probability may be obtained based on the second probability and/or the third probability. For example, first probability=second probability+third probability; or the first probability is the maximum of the second probability and the third probability; or the first probability is the minimum of the second probability and the third probability; or the first probability is equal to the second probability; or the first probability is equal to the third probability.

At least one of the first probability, the second probability, and the third probability is related to the measurement parameter or the threshold value of the measurement parameter.

In some embodiments, a ratio and/or difference between the second probability and the third probability is obtained by using an RSRP ratio and/or difference between the candidate resource set and the assistance resource set, for example:

second probability/third probability=f (RSRP2/RSRP1), f (RSRP2/RSRP1)=a*RSRP2/RSRP1; or second probability−third probability=f (RSRP1−RSRP2), f (RSRP1−RSRP2)=a*RSRP1−RSRP2.

In some embodiments, the TX UE obtains assistance information of another node (including a control node and another UE), and the TX UE selects or maintains N (N>=1) resources of the sidelink grant (SL grant) based on the assistance information. The resource of the SL grant includes one or a group of SL transmission resources, where a value and/or a maximum value and/or a minimum value of the number N of the sidelink grants are/is a value/values specified by a protocol or configured by a control node or pre-configured by a control node or indicated by another UE.

In some embodiments, the obtaining or creating, by the transmit user equipment, at least one sidelink grant based on the assistance information includes any one of the following:

the assistance information includes resource information of a sidelink grant suggested by another UE, the transmit user equipment selects N resources of the sidelink grant from the suggested resource information of the sidelink grant, and N is a positive integer; and the assistance information includes resource reservation information of a sidelink grant of another UE, and the transmit user equipment selects N resources of the sidelink grant based on the resource reservation information of the sidelink grant.

In some embodiments, a resource indicated by the resource reservation information of the sidelink grant is a resource with a first priority or a resource with a second priority, and the first priority is higher than the second priority. When the transmit user equipment selects a resource based on the resource reservation information of the sidelink grant, the resource with a first priority is selected preferentially. The resource with the first priority may be referred to as a real SL grant resource reserved, which is the resource selected by the TX UE with the high priority, and the resource with the second priority may be referred to as a pseudo SL grant resource reserved, which is the resource selected by the TX UE with the low priority.

In some embodiments, the method further includes:

indicating, by the transmit user equipment, a selected resource of the sidelink grant to another UE in a resource reservation manner.

In this way, when another UE performs resource selection, the resource selection may be performed based on the resource of the sidelink grant selected by the transmit user equipment, so as to improve the reliability of the sidelink transmission.

When the TX UE performs SL transmission by using a specific SL grant (for example, data transmission or transmission of a signal for the purpose of resource reservation), the resource of the SL grant is reserved. In some implementations, if the resource set may be divided into different resource modes, the TX UE only needs to perform transmission on a divided SL grant resource, and when UE nearby detects that the TX UE performs transmission on an SL grant resource, the UE nearby may determine, by default, that the SL grant resource is occupied; if it may be divided that the SL grant resource appears periodically, when the resource is reserved, it may also indicate how many periods the SL grant resource will be reserved.

The resource indicated by the transmit user equipment to another UE is a resource with a first priority or a resource with a second priority, and the first priority is higher than the second priority. The resource with the first priority may be referred to as a real SL grant resource reserved, which is the resource used by the TX UE with the high priority, and the resource with the second priority may be referred to as a pseudo SL grant resource reserved, which is the resource used by the TX UE with the low priority or the resource that can be used only when some conditions are met.

When the selected resource of the sidelink grant is indicated to another UE in a resource reservation manner, the transmit user equipment separately indicates each selected resource of the sidelink grant to another UE; or the transmit user equipment uniformly indicates all or part of selected resources of the sidelink grant to another UE through physical layer signaling or high layer signaling.

In some embodiments, after the obtaining or creating, by the transmit user equipment, at least one sidelink grant based on the assistance information, the method further includes:

selecting, by the transmit user equipment, a resource used for sidelink transmission from resources of the at least one sidelink grant based on any one of the following, and/or selecting a sidelink grant used for sidelink transmission from the at least one sidelink grant:

a transmission time, that is, selecting the SL grant resource used for sidelink transmission based on the transmission time;

a location of the transmit user equipment, that is, selecting the SL grant resource used for sidelink transmission based on the location of the TX UE such as a zone ID; and an identifier of the transmit user equipment, that is, selecting the SL grant resource used for sidelink transmission based on the identifier of the transmit user equipment such as a UE ID or a member ID.

By selecting the resource used for the sidelink transmission or selecting the sidelink grant used for the sidelink transmission in the foregoing manners, the transmission interference can be randomized.

In this embodiment, one resource set may be divided into or configured or pre-configured as resources of one or at least two of the sidelink grants in a preset mode for the UE to select based on a fixed resource mode. For example, the resource set may be divided into an orthogonal SL grant resource or a partially overlapping SL grant resource or both based on the resource mode.

When the transmit user equipment performs resource selection based on at least one piece of the assistance information notified by another node, performing, by the transmit user equipment, resource selection based on at least one piece of the assistance information includes at least one of the following:

obtaining, by the transmit user equipment, at least one piece of assistance information notified by a unicast RX UE;

obtaining, by the transmit user equipment, at least one piece of assistance information notified by groupcast RX UEs; and obtaining, by the transmit user equipment, at least one piece of assistance information notified by a proximity UE.

Figure 5:
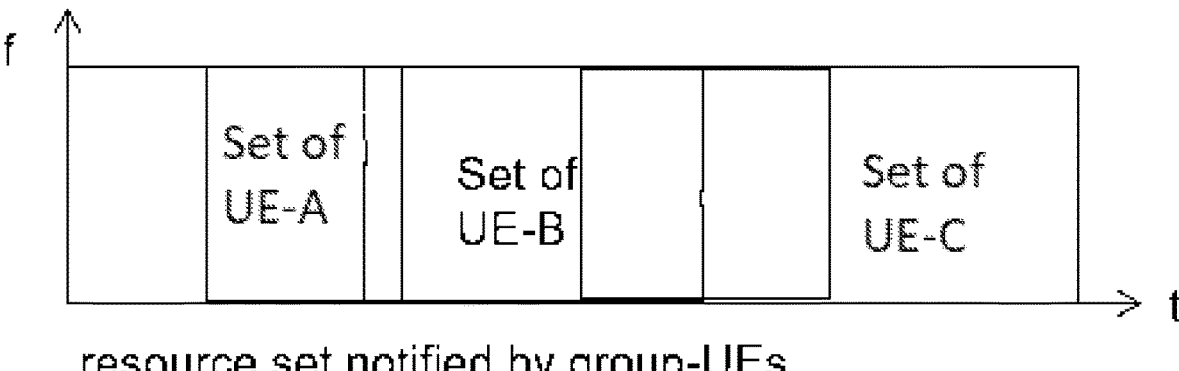
Figure 6:
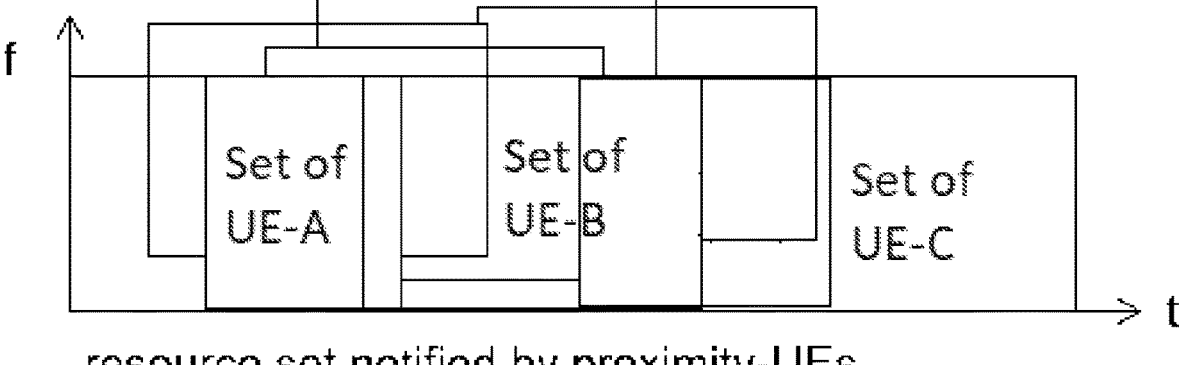

In some embodiments, the UE notifies another neighboring UE of a resource that the UE prefers to use. When another UE is used as the TX UE, the resource notification information needs to be taken into account for resource selection. For unicast transmission, as shown in FIG. 4, the TX UE only needs to consider a resource that the RX UE thereof (such as UE-A in the figure) tends to select, so as to perform resource selection, where a set of UE-A is a resource set of UE-A, and a resource set notified by pair-UE is a resource set notified by peer UE; for groupcast transmission, as shown in FIG. 5, the TX UE needs to consider a resource that at least two RX UEs thereof (such as UE-A, UE-B, and UE-C in FIG. 5) tend to select, so as to perform resource selection, where a set of UE-A is a resource set of UE-A, a set of UE-B is a resource set of UE-B, a set of UE-C is a resource set of UE-C, and a resource set notified by group-UEs is a resource set notified by the groupcast UE; for broadcast transmission, as shown in FIG. 6, the TX UE needs to consider a resource that at least two proximity-UEs thereof (such as UE-A, UE-B, UE-C, and the like in the figure) tend to select, so as to perform resource selection, where a set of UE-A is a resource set of UE-A, a set of UE-B is a resource set of UE-B, and a set of UE-C is a resource set of UE-C, a resource set notified by proximity-UEs is a resource set notified by the proximity UE. The proximity-UEs of the TX UE may be determined based on a distance between the TX UE and a neighboring UE, for example, the distance between the neighboring UE and the TX UE is less than a preset threshold value, the neighboring UE is a proximity-UE, and the distance may be an absolute distance between UEs, or a reference distance between the TX UE and a zone where the neighboring UE is located (for example, a distance between the TX UE and a center of the zone where the neighboring UE is located), or an energy value measured by a signal sent by the TX UE from the neighboring UE (for example, an RSRP or RSSI or RSRO or SNR or SINR value).

When performing resource selection based on at least one piece of the assistance information, the transmit user equipment needs to process the assistance information, including:

receiving, by the transmit user equipment, M resource sets notified by another node;

determining, by the transmit user equipment, a second weight of the resource based on a first weight of the resource in the M resource sets; and performing, by the transmit user equipment, resource selection based on the second weight of the resource.

In an example, the determining, by the transmit user equipment, a second weight of the resource based on a first weight of the resource in the M resource sets includes any one of the following:

in a case that the resource belongs to L resource sets among the M resource sets, numbering the L resource sets from i to j, and the second weight W of the resource is:

$$W = \sum\nolimits_{n=i}^{j} Wn,$$

Wn is a first weight of the resource in an $n^{th}$ resource set, n is an integer greater than or equal to i and less than or equal to j, and i and j are integers greater than or equal to 1 and less than or equal to M; and in a case that the resource belongs to L resource sets among the M resource sets, numbering the L resource sets from i to j, and the second weight W of the resource is:

$$W = \sum\nolimits_{n=i}^{j} (Kn * Wn),$$

Wn is a first weight of the resource in an $n^{th}$ resource set, n is an integer greater than or equal to i and less than or equal to j, and i and j are integers greater than or equal to 1 and less than or equal to M.

Wi . . . Wj may be 1;

Kn is related to the distance between the UE notifying the assistance information and the transmit user equipment, for example, an absolute distance, a zone (zone) distance, a signal measurement strength RSRP, RSSI, or the like, and a value of k increases or decreases with the increase of distance or signal strength; or Kn is obtained based on a source or a validity period of the assistance information, for example, the older the assistance information is, the smaller the weighted value is. For another example, a weight of assistance information from a base station side is higher than that from a UE side, and a weight of assistance information from a scheduling UE side is higher than that from a common UE side.

When performing resource selection, for a resource in the resource selection window, the TX UE processes parameters in resource selection based on the weight. For example, the transmit user equipment adjusts the measurement parameter value of the resource based on the second weight of the resource. For example, in a process of obtaining the candidate resource set, for a resource in the resource selection window, the RSRP measurement value or the RSRP threshold is changed based on the resource weight, for example, the RSRP measurement value of the resource is adjusted to W*RSRP or RSRP+/−W, where W is the resource weight; or the transmit user equipment adjusts a probability of the resource to be selected based on the second weight of the resource, for example, when a transmission resource is selected in the candidate resource set, a resource selection probability is adjusted, for example, the probability of the resource to be selected is a function f (W) of W, and f (W) may be an increasing function.

It should be noted that the resource selection method provided in the embodiments of this application may be performed by a resource selection apparatus or a module that is in the resource selection apparatus and that is configured to perform and load the resource selection method. In the embodiments of this application, that the resource selection apparatus performs and loads the resource selection method is used as an example to describe the resource selection apparatus provided in the embodiments of this application.

Figure 7:
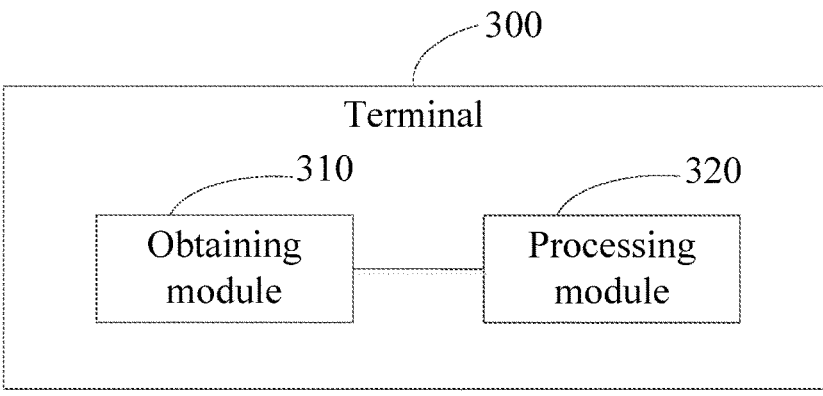
FIG. 7 is a schematic structural diagram of a resource selection apparatus according to an embodiment of this application.

An embodiment of this application provides a resource selection apparatus, applied to a terminal 300. As shown in FIG. 7, the apparatus includes:

an obtaining module 310, configured to obtain assistance information of another node; and a processing module 320, configured to perform resource selection based on at least the assistance information, including any one of the following:

determining a candidate resource set based on a resource sensing result and/or the assistance information, and performing resource selection based on the candidate resource set and/or the assistance information;

obtaining or creating at least one sidelink grant based on the assistance information, where the sidelink grant includes one or a group of sidelink transmission resources; and performing resource selection based on at least one piece of the assistance information.

In the embodiments of this application, the transmit user equipment obtains the assistance information of another node and uses the assistance information to perform resource selection, so that the transmit user equipment can perform resource selection reasonably, and both low delay and high reliability requirements are satisfied to ensure higher reliability of sidelink transmission.

In some embodiments, the assistance information includes at least one of the following:

an assistance resource set;

a resource-related measurement parameter;

resource-related priority information; and a threshold value of a resource-related measurement parameter.

In some embodiments, the processing module 320 is configured to determine a resource-related measurement parameter value and/or a threshold value of a resource-related measurement parameter in a resource selection window by using a resource-related measurement parameter in the assistance information and/or a resource-related measurement parameter obtained based on a resource sensing result.

In some embodiments, the processing module 320 is configured to determine a resource quality parameter value and/or a threshold value Y of a resource-related measurement parameter in the resource selection window by using any of the following formulas:

$$Y = a*Y1 + b*Y2;$$

$$Y = \min(Y1, Y2);\ \text{and}$$

$$Y = \max(Y1, Y2),\ \text{where}$$

Y1 is a resource-related measurement parameter and/or a threshold value of a resource-related measurement parameter obtained based on a resource sensing result, Y2 is a resource-related measurement parameter and/or a threshold value of a resource-related measurement parameter in the assistance information, and a and b are values specified by a protocol or configured by a control node or pre-configured by a control node or indicated by another UE.

In some embodiments, the processing module 320 is configured to: in a case that the resource-related measurement parameter in the assistance information is greater than a first preset threshold, adjust a value of the resource-related measurement parameter in the assistance information to a first preset value; and in a case that the resource-related measurement parameter in the assistance information is less than a second preset threshold, adjust a value of the resource-related measurement parameter in the assistance information to 0, where the first preset threshold, the second preset threshold, and the first preset value are values specified by a protocol or configured by a control node or pre-configured by a control node or indicated by another UE.

In some embodiments, the processing module 320 is configured to determine a priority value of a resource in a resource selection window by using resource priority information in the assistance information and/or resource priority information obtained based on a resource sensing result.

In some embodiments, the processing module 320 is configured to determine a priority value X of a resource in the resource selection window by using any of the following formulas:

$$X = c*X1 + d*X2;$$

$$X = \min(X1, X2);\ \text{and}$$

$$X = \max(X1, X2),\ \text{where}$$

X1 is the resource priority information obtained based on the resource sensing result, X2 is the resource priority information in the assistance information, and c and d are values specified by a protocol or configured by a control node or pre-configured by a control node or indicated by another UE.

In some embodiments, the processing module 320 is configured to: in a case that the resource priority information in the assistance information is greater than a third preset threshold, adjust a value of the resource priority information in the assistance information to a second preset value; and in a case that the resource priority information in the assistance information is less than a fourth preset threshold, adjust a value of the resource priority information in the assistance information to 0, where the third preset threshold, the fourth preset threshold, and the second preset value are values specified by a protocol or configured by a control node or pre-configured by a control node or indicated by another UE.

In some embodiments, the processing module 320 is configured to: determine a measurement value threshold of a candidate resource based on assistance information notified by a receive user equipment, and determine the candidate resource set based on the measurement value threshold.

In some embodiments, the measurement value threshold includes the threshold value of the resource-related measurement parameter in the assistance information or is determined based on the assistance information.

In some embodiments, the processing module 320 is configured to determine a probability of each candidate resource to be selected based on the assistance resource set and the candidate resource set, where a first candidate resource has a first probability, and the first candidate resource is located in both the assistance resource set and the candidate resource set; a second candidate resource has a second probability, and the second candidate resource is located in the candidate resource set but not in the assistance resource set; a third candidate resource has a third probability, and the third candidate resource is located in the assistance resource set but not in the candidate resource set.

In some embodiments, the first probability is obtained based on the second probability and/or the third probability.

In some embodiments, at least one of the first probability, the second probability, and the third probability is related to the measurement parameter or the threshold value of the measurement parameter.

In some embodiments, a value and/or a maximum value and/or a minimum value of the number N of the sidelink grants are/is a value/values specified by a protocol or configured by a control node or pre-configured by a control node or indicated by another UE.

In some embodiments, the processing module 320 is configured to perform any one of the following:

when the assistance information includes resource information of a sidelink grant suggested by another UE, selecting N resources of the sidelink grant from the suggested resource information of the sidelink grant, and N is a positive integer; and when the assistance information includes resource reservation information of a sidelink grant of another UE, selecting N resources of the sidelink grant based on the resource reservation information of the sidelink grant.

In some embodiments, a resource indicated by the resource reservation information of the sidelink grant is a resource with a first priority or a resource with a second priority, and the first priority is higher than the second priority.

In some embodiments, the processing module 320 is configured to preferentially select the resource with a first priority when a resource is selected based on the resource reservation information of the sidelink grant.

In some embodiments, the processing module 320 is configured to indicate a selected resource of the sidelink grant to another UE in a resource reservation manner.

In some embodiments, the resource indicated by the processing module 320 to another UE is a resource with a first priority or a resource with a second priority, and the first priority is higher than the second priority.

In some embodiments, the processing module 320 is configured to: separately indicate each selected resource of the sidelink grant to another UE; or uniformly indicate all or part of selected resources of the sidelink grant to another UE through physical layer signaling or high layer signaling.

In some embodiments, the processing module 320 is further configured to: select a resource used for sidelink transmission from resources of the at least one sidelink grant based on any one of the following, and/or select a sidelink grant used for sidelink transmission from the at least one sidelink grant:

a transmission time;

a location of the transmit user equipment; and an identifier of the transmit user equipment.

In some embodiments, one resource set is divided into or configured or pre-configured as resources of one or at least two of the sidelink grants in a preset mode.

In some embodiments, the processing module 320 is configured to perform at least one of the following:

obtaining at least one piece of assistance information notified by a unicast RX UE;

obtaining at least one piece of assistance information notified by groupcast RX UEs; and obtaining at least one piece of assistance information notified by a proximity UE.

In some embodiments, the processing module 320 is configured to: receive M resource sets notified by another node; determine a second weight of the resource based on a first weight of the resource in the M resource sets; and perform resource selection based on the second weight of the resource.

In some embodiments, in a case that the resource belongs to L resource sets among the M resource sets, the L resource sets are numbered from i to j, and the second weight W of the resource is:

$$W = \sum\nolimits_{n=i}^{j} Wn,$$

Wn is a first weight of the resource in an $n^{th}$ resource set, n is an integer greater than or equal to i and less than or equal to j, and i and j are integers greater than or equal to 1 and less than or equal to M; and in a case that the resource belongs to L resource sets among the M resource sets, the L resource sets are numbered from i to j, and the second weight W of the resource is:

$$W = \sum\nolimits_{n=i}^{j} (Kn * Wn),$$

Wn is a first weight of the resource in an nth resource set, n is an integer greater than or equal to i and less than or equal to j, and i and j are integers greater than or equal to 1 and less than or equal to M.

In some embodiments, Kn is related to a distance between UE notifying the assistance information and the transmit user equipment; or Kn is obtained based on a source or a validity period of the assistance information.

In some embodiments, the processing module 320 is configured to perform any one of the following:

adjusting, by the transmit user equipment, a measurement parameter value of the resource based on the second weight of the resource; and adjusting, by the transmit user equipment, a probability of the resource to be selected based on the second weight of the resource.

In some embodiments, the assistance information further includes at least one of the following:

a source or a type of the assistance information;

a timestamp of the assistance information;

a validity period of the assistance information;

location information of UE sending the assistance information;

a moving speed of UE sending the assistance information; and a moving direction of UE sending the assistance information.

The resource selection apparatus in this embodiment of this application may be an apparatus, or may be a component, an integrated circuit, or a chip in a terminal. The apparatus may be a mobile electronic device, or may be a non-mobile electronic device. For example, the mobile electronic device may be a mobile phone, a tablet computer, a notebook computer, a palmtop computer, an in-vehicle electronic device, a wearable device, an Ultra-Mobile Personal Computer (UMPC), a netbook, a Personal Digital Assistant (PDA), or the like. The non-mobile electronic device may be a Network Attached Storage (NAS), a personal computer, a television, a teller machine, a self-service machine, or the like. This is not specifically limited in the embodiments of this application.

The resource selection apparatus in this embodiment of this application may be an apparatus with an operating system. The operating system may be an Android operating system, an iOS operating system, or another possible operating system, which is not specifically limited in the embodiments of this application.

An embodiment of this application further provides an electronic device, including a processor, a memory, and a program or an instruction stored in the memory and executable on the processor. When the program or the instruction is executed by the processor, the processes of the foregoing resource selection method embodiment are implemented, and a same technical effect can be achieved. To avoid repetition, details are not described herein again.

It should be noted that the electronic device in this embodiment of this application includes the foregoing mobile electronic device and the foregoing non-mobile electronic device.

Figure 8:
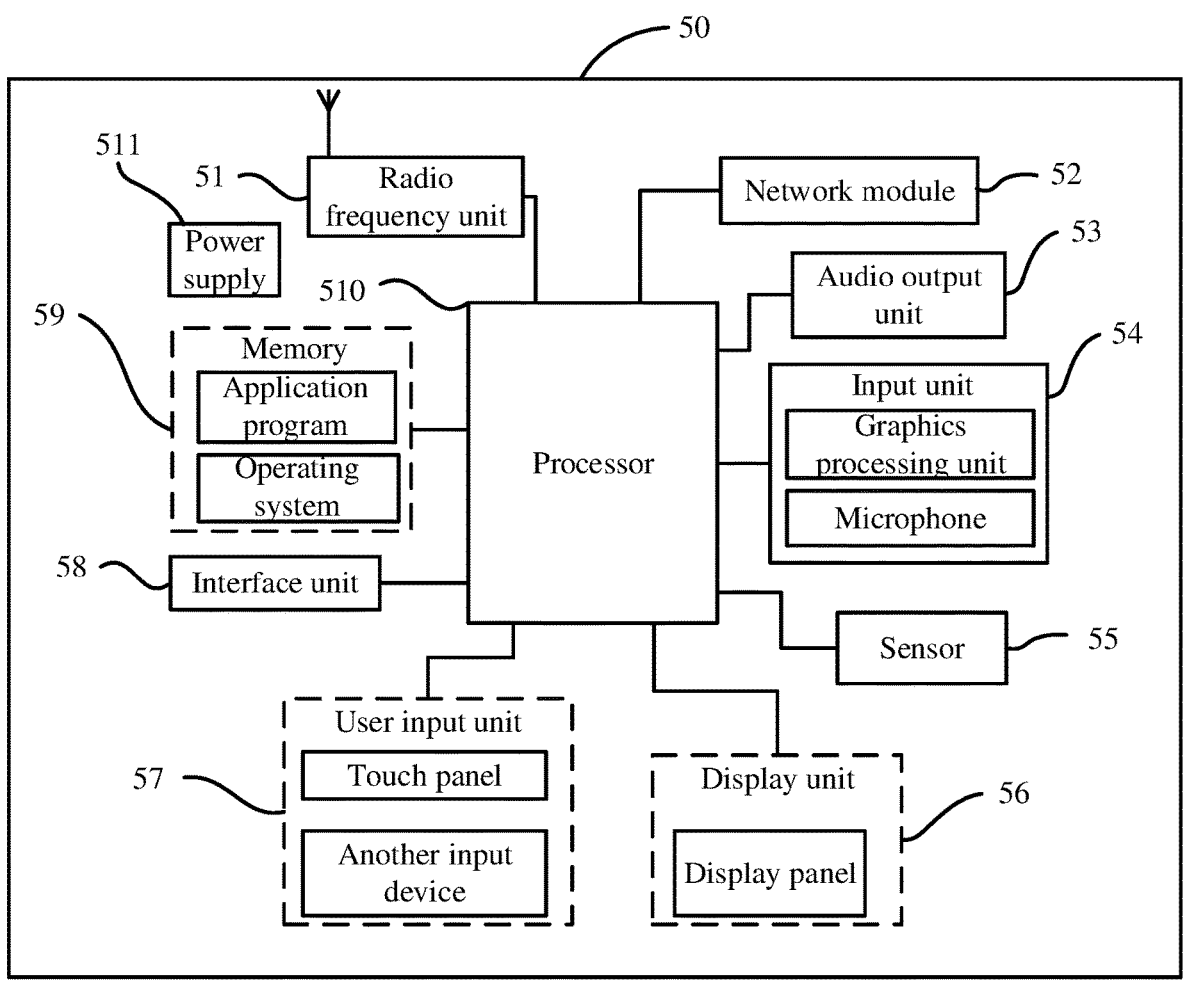
FIG. 8 is a schematic diagram of composition of a terminal according to an embodiment of this application.

The electronic device in this embodiment may be a terminal. FIG. 8 is a schematic diagram of a hardware structure of a terminal according to the embodiments of this application. The terminal 50 includes but is not limited to components such as a radio frequency unit 51, a network module 52, an audio output unit 53, an input unit 54, a sensor 55, a display unit 56, a user input unit 57, an interface unit 58, a memory 59, a processor 510, and a power supply 511. It can be understood by a person skilled in the art that, the terminal structure shown in FIG. 8 does not constitute any limitation on the terminal, and the terminal may include more or fewer components than those shown in the figure, or combine some components, or have different component arrangements. In this embodiment of this application, the terminal includes but is not limited to a mobile phone, a tablet computer, a notebook computer, a palmtop computer, an in-vehicle terminal, a wearable device, a pedometer, and the like.

It should be understood that, in this embodiment of this application, the radio frequency unit 51 may be configured to receive and send information or a signal in a call process. In some implementations, after receiving downlink data from a base station, the radio frequency unit sends the downlink data to the processor 510 for processing. In addition, the radio frequency unit sends uplink data to the base station. Usually, the radio frequency unit 51 includes but is not limited to an antenna, at least one amplifier, a transceiver, a coupler, a low noise amplifier, a duplexer, and the like. In addition, the radio frequency unit 51 may further communicate with a network and another device through a wireless communications system.

The memory 59 may be configured to store a software program and various pieces of data. The memory 59 may mainly include a program storage region and a data storage region. The program storage region may store an operating system, an application program required by at least one function (such as a sound play function or an image play function), and the like. The data storage region may store data (such as audio data or an address book) created based on use of the mobile phone, and the like. In addition, the memory 59 may include a high-speed random access memory, and may further include a nonvolatile memory, for example, at least one magnetic disk storage device, a flash storage device, or another volatile solid-state storage device.

The processor 510 is a control center of the terminal, and connects all parts of the entire terminal by using various interfaces and lines. By running or executing a software program and/or a module stored in the memory 59 and invoking data stored in the memory 59, the processor 510 performs various functions of the terminal and data processing, to perform overall monitoring on the terminal. The processor 510 may include one or at least two processing units. In some implementations, an application processor and a modem processor may be integrated into the processor 510. The application processor mainly processes an operating system, a user interface, an application program, and the like. The modem processor mainly processes wireless communications. It can be understood that, in some implementations, the modem processor may not be integrated into the processor 510.

The terminal 50 may further include a power supply 511 (such as a battery) that supplies power to each component. In some implementations, the power supply 511 may be logically connected to the processor 510 by using a power management system, to implement functions such as charging, discharging, and power consumption management by using the power management system.

In addition, the terminal 50 includes some function modules not shown, and details are not described herein.

The processor 510 is configured to: obtain assistance information of another node; and perform resource selection based on at least the assistance information, including any one of the following:

determining a candidate resource set based on a resource sensing result and/or the assistance information, and performing resource selection based on the candidate resource set and/or the assistance information;

obtaining or creating at least one sidelink grant based on the assistance information, where the sidelink grant includes one or a group of sidelink transmission resources; and performing resource selection based on at least one piece of the assistance information.

In some embodiments, the assistance information includes at least one of the following:

an assistance resource set;

a resource-related measurement parameter;

resource-related priority information; and a threshold value of a resource-related measurement parameter.

In some embodiments, the processor 510 is configured to determine a resource-related measurement parameter value and/or a threshold value of a resource-related measurement parameter in a resource selection window by using a resource-related measurement parameter in the assistance information and/or a resource-related measurement parameter obtained based on a resource sensing result.

In some embodiments, the processor 510 is configured to determine a resource quality parameter value and/or a threshold value Y of a resource-related measurement parameter in the resource selection window by using any of the following formulas:

$$Y=a*Y1+b*Y2;$$

$$Y=\min(Y1,Y2); \text{ and}$$

$$Y=\max(Y1,Y2), \text{ where}$$

Y1 is a resource-related measurement parameter and/or a threshold value of a resource-related measurement parameter obtained based on a resource sensing result, Y2 is a resource-related measurement parameter and/or a threshold value of a resource-related measurement parameter in the assistance information, and a and b are values specified by a protocol or configured by a control node or pre-configured by a control node or indicated by another UE.

In some embodiments, the processor 510 is configured to: in a case that the resource-related measurement parameter in the assistance information is greater than a first preset threshold, adjust a value of the resource-related measurement parameter in the assistance information to a first preset value; and in a case that the resource-related measurement parameter in the assistance information is less than a second preset threshold, adjust a value of the resource-related measurement parameter in the assistance information to 0, where the first preset threshold, the second preset threshold, and the first preset value are values specified by a protocol or configured by a control node or pre-configured by a control node or indicated by another UE.

In some embodiments, the processor 510 is configured to determine a priority value of a resource in a resource selection window by using resource priority information in the assistance information and/or resource priority information obtained based on a resource sensing result.

In some embodiments, the processor 510 is configured to determine a priority value X of a resource in the resource selection window by using any of the following formulas:

$$X=c*X1+d*X2;$$

$$X=\min(X1,X2); \text{ and}$$

$$X=\max(X1,X2), \text{ where}$$

X1 is the resource priority information obtained based on the resource sensing result, X2 is the resource priority information in the assistance information, and c and d are values specified by a protocol or configured by a control node or pre-configured by a control node or indicated by another UE.

In some embodiments, the processor 510 is configured to: in a case that the resource priority information in the assistance information is greater than a third preset threshold, adjust a value of the resource priority information in the assistance information to a second preset value; and in a case that the resource priority information in the assistance information is less than a fourth preset threshold, adjust a value of the resource priority information in the assistance information to 0, where the third preset threshold, the fourth preset threshold, and the second preset value are values specified by a protocol or configured by a control node or pre-configured by a control node or indicated by another UE.

In some embodiments, the processor 510 is configured to: determine a measurement value threshold of a candidate resource based on assistance information notified by a receive user equipment, and determine the candidate resource set based on the measurement value threshold.

In some embodiments, the measurement value threshold includes the threshold value of the resource-related measurement parameter in the assistance information or is determined based on the assistance information.

In some embodiments, the processor 510 is configured to determine a probability of each candidate resource to be selected based on the assistance resource set and the candidate resource set, where a first candidate resource has a first probability, and the first candidate resource is located in both the assistance resource set and the candidate resource set; a second candidate resource has a second probability, and the second candidate resource is located in the candidate resource set but not in the assistance resource set; a third candidate resource has a third probability, and the third candidate resource is located in the assistance resource set but not in the candidate resource set.

In some embodiments, the first probability is obtained based on the second probability and/or the third probability.

In some embodiments, at least one of the first probability, the second probability, and the third probability is related to the measurement parameter or the threshold value of the measurement parameter.

In some embodiments, a value and/or a maximum value and/or a minimum value of the number N of the sidelink grants are/is a value/values specified by a protocol or configured by a control node or pre-configured by a control node or indicated by another UE.

In some embodiments, the assistance information includes resource information of a sidelink grant suggested by another UE, the processor 510 is configured to select N resources of the sidelink grant from the suggested resource information of the sidelink grant, and N is a positive integer; and the assistance information includes resource reservation information of a sidelink grant of another UE, and the processor 510 is configured to select N resources of the sidelink grant based on the resource reservation information of the sidelink grant.

In some embodiments, a resource indicated by the resource reservation information of the sidelink grant is a resource with a first priority or a resource with a second priority, and the first priority is higher than the second priority.

In some embodiments, the processor 510 is configured to preferentially select the resource with a first priority when a resource is selected based on the resource reservation information of the sidelink grant.

In some embodiments, the processor 510 is configured to indicate a selected resource of the sidelink grant to another UE in a resource reservation manner.

In some embodiments, the resource indicated by the transmit user equipment to another UE is a resource with a first priority or a resource with a second priority, and the first priority is higher than the second priority.

In some embodiments, the processor 510 is configured to separately indicate each selected resource of the sidelink grant to another UE; or the processor 510 is configured to uniformly indicate all or part of selected resources of the sidelink grant to another UE through physical layer signaling or high layer signaling.

In some embodiments, the processor 510 is configured to: select a resource used for sidelink transmission from resources of the at least one sidelink grant based on any one of the following, and/or select a sidelink grant used for sidelink transmission from the at least one sidelink grant:

a transmission time;

a location of the transmit user equipment; and an identifier of the transmit user equipment.

In some embodiments, one resource set is divided into or configured or pre-configured as resources of one or at least two of the sidelink grants in a preset mode.

In some embodiments, the processor 510 is configured to perform at least one of the following:

obtaining at least one piece of assistance information notified by a unicast RX UE;

obtaining at least one piece of assistance information notified by groupcast RX UEs; and obtaining at least one piece of assistance information notified by a proximity UE.

In some embodiments, the processor 510 is configured to: receive M resource sets notified by another node; determine a second weight of the resource based on a first weight of the resource in the M resource sets; and perform resource selection based on the second weight of the resource.

In some embodiments, in a case that the resource belongs to L resource sets among the M resource sets, the L resource sets are numbered from i to j, and the second weight W of the resource is:

$$W = \sum_{n=i}^{j} Wn,$$

Wn is a first weight of the resource in an $n^{th}$ resource set, n is an integer greater than or equal to i and less than or equal to j, and i and j are integers greater than or equal to 1 and less than or equal to M; and in a case that the resource belongs to L resource sets among the M resource sets, numbering the L resource sets from i to j, and the second weight W of the resource is:

$$W = \sum_{n=i}^{j} (Kn * Wn),$$

Wn is a first weight of the resource in an nth resource set, n is an integer greater than or equal to i and less than or equal to j, and i and j are integers greater than or equal to 1 and less than or equal to M.

In some embodiments, Kn is related to a distance between UE notifying the assistance information and the transmit user equipment; or Kn is obtained based on a source or a validity period of the assistance information.

In some embodiments, the processor 510 is configured to: adjust a measurement parameter value of the resource based on the second weight of the resource; and adjust a probability of the resource to be selected based on the second weight of the resource.

In some embodiments, the assistance information further includes at least one of the following:

a source or a type of the assistance information;

a timestamp of the assistance information;

a validity period of the assistance information;

location information of UE sending the assistance information;

a moving speed of UE sending the assistance information; and a moving direction of UE sending the assistance information.

An embodiment of this application further provides a readable storage medium, where the readable storage medium stores a program or an instruction, and when the program or the instruction is executed by a processor, the processes of the foregoing resource selection method embodiment are implemented, and a same technical effect can be achieved. To avoid repetition, details are not described herein again.

The processor is a processor in the electronic device in the foregoing embodiment. The readable storage medium includes a computer-readable storage medium such as a Read-Only Memory (ROM), a Random Access Memory (RAM), a magnetic disk, an optical disc, or the like.

An embodiment of this application also provides a chip. The chip includes a processor and a communications interface, and the communications interface is coupled to the processor. The processor is configured to run a program or an instruction to implement the processes of the foregoing resource selection method embodiment, and a same technical effect can be achieved. To avoid repetition, details are not described herein again.

It should be understood that the chip mentioned in this embodiment of this application may also be referred to as a system-level chip, a system chip, a system on chip, a system chip on chip, and the like.

It should be noted that, in this specification, the terms "include," "comprise," or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element limited by "includes a . . . " does not, without more constraints, preclude the presence of additional identical elements in the process, method, article, or apparatus that includes the element. In addition, it should be noted that the scope of the methods and apparatuses in the embodiments of this application is not limited to performing functions in the order shown or discussed, but may also include performing the functions in a basically simultaneous manner or in opposite order based on the functions involved. For example, the described methods may be performed in a different order from the described order, and various steps may be added, omitted, or combined. In addition, features described with reference to some examples may be combined in other examples.

A person of ordinary skill in the art may recognize that, with reference to the examples described in the embodiments disclosed herein, units and algorithm steps may be implemented by electronic hardware or a combination of computer software and electronic hardware. Whether these functions are implemented by using hardware or software depends on the specific application and design constraints of the technical solution. A person skilled in the art may use different methods to implement the described functions for each particular application, but it should not be considered that the implementation goes beyond the scope of the present disclosure.

It may be clearly understood by a person skilled in the art that, for convenience and brevity of description, for a specific working process of the above described system, apparatus, and unit, reference may be made to a corresponding process in the above method embodiments, and details are not described herein again.

In the embodiments provided in this application, it should be understood that the disclosed apparatus and method may be implemented in another manner. For example, the described apparatus embodiment is merely an example. For example, the unit division is merely logical function division. In actual implementation, there may be another division manner. For example, multiple units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one place, or may be distributed on multiple network units. Some or all of the units may be selected based on an actual requirement to implement the objectives of the solutions in the embodiments.

In addition, functional units in the embodiments of the present disclosure may be integrated into one processing unit, or each of the units may exist alone physically, or two or more units are integrated into one unit.

Based on the descriptions of the foregoing implementation manners, a person skilled in the art may clearly understand that the method in the foregoing embodiment may be implemented by software in addition to a necessary universal hardware platform or by hardware only. Based on such understanding, the technical solutions of this application essentially, or the part contributing to the prior art may be implemented in a form of a software product. The computer software product is stored in a storage medium (for example, a ROM/RAM, a magnetic disk, or a compact disc), and includes several instructions for instructing a terminal (which may be a mobile phone, a computer, a server, an air conditioner, a network device, or the like) to perform the method described in the embodiments of this application.

It can be understood that the embodiments described in the present disclosure may be implemented by hardware, software, firmware, middleware, microcode, or a combination thereof. For implementation with hardware, the module, unit, and subunit may be implemented in one or more Application Specific Integrated Circuits (ASIC), a Digital Signal Processing (DSP), a DSP device (DSPD), a Programmable Logic Device (PLD), a Field-Programmable Gate Array (FPGA), general processors, controllers, micro-controllers, micro-processors, and other electronic units for implementing the functions of the present disclosure, or their combinations.

For implementation with software, technologies described in the embodiments of the present disclosure may be implemented by executing functional modules (for example, a process and a function) in the embodiments of the present disclosure. A software code may be stored in the memory and executed by the processor. The memory may be implemented in the processor or outside the processor.

The embodiments of this application are described above with reference to the accompanying drawings, but this application is not limited to the foregoing specific implementation manners. The foregoing specific implementation manners are merely schematic instead of restrictive. Under enlightenment of this application, a person of ordinary skills in the art may make many forms without departing from aims and the protection scope of claims of this application, all of which fall within the protection scope of this application.

The invention claimed is:

1. A resource selection method, performed by a transmit user equipment, comprising:
obtaining assistance information from a plurality of user equipments; and
performing resource selection based on at least the assistance information comprises:

performing resource selection for unicast transmission to a receiving user equipment based on;
a candidate resource set, and
an assistance resource set indicated by the assistance information received from the receiving user equipment,
wherein among the assistance information obtained from the plurality of user equipments, only the assistance information transmitted by the receiving user equipment is used for the resource selection,
wherein the assistance resource set indicated by the assistance information is a resource set preferred by the receiving user equipment, and
wherein the candidate resource set is determined by the transmit user equipment according to a resource sensing result.

2. The resource selection method according to claim 1, wherein the assistance information comprises at least one of the following:
a resource-related measurement parameter;
resource-related priority information; or
a threshold value of a resource-related measurement parameter.

3. The resource selection method according to claim 2, wherein performing resource selection based on at least the assistance information comprises determining the candidate resource set based on the resource sensing result or the assistance information, wherein performing resource selection based on the assistance resource set or the candidate resource set comprises:
determining a probability of each candidate resource to be selected based on the assistance resource set and the candidate resource set, wherein:
a first candidate resource has a first probability, and the first candidate resource is located in both the assistance resource set and the candidate resource set;
a second candidate resource has a second probability, and the second candidate resource is located in the candidate resource set but not in the assistance resource set; and
a third candidate resource has a third probability, and the third candidate resource is located in the assistance resource set but not in the candidate resource set.

4. The resource selection method according to claim 1, wherein performing resource selection based on at least the assistance information comprises determining the candidate resource set based on the resource sensing result or the assistance information comprising:
determining a resource-related measurement parameter value or a threshold value of a resource-related measurement parameter in a resource selection window by using a resource-related measurement parameter in the assistance information or a resource-related measurement parameter obtained based on the resource sensing result.

5. The resource selection method according to claim 4, wherein the determining a resource-related measurement parameter value or a threshold value of a resource-related measurement parameter in a resource selection window by using a resource-related measurement parameter in the assistance information or a resource-related measurement parameter obtained based on the resource sensing result comprises:

determining a resource quality parameter value or a threshold value Y of a resource-related measurement parameter in the resource selection window by using any of the following formulas:

$$Y=a*Y1+b*Y2;$$

$$Y=\min(Y1,Y2); \text{ or}$$

$$Y=\max(Y1,Y2), \text{ wherein}$$

Y1 is a resource-related measurement parameter or a threshold value of a resource-related measurement parameter obtained based on the resource sensing result, Y2 is a resource-related measurement parameter or a threshold value of a resource-related measurement parameter in the assistance information, and a and b are values specified by a protocol or configured by a control node or pre-configured by a control node or indicated by another user equipment.

6. The resource selection method according to claim 4, wherein when the resource-related measurement parameter or the threshold value of the resource-related measurement parameter in the assistance information is greater than a first preset threshold, adjusting a value of the resource-related measurement parameter or the threshold value of the resource-related measurement parameter in the assistance information to a first preset value; and when the resource-related measurement parameter or the threshold value of the resource-related measurement parameter in the assistance information is less than a second preset threshold, adjusting a value of the resource-related measurement parameter or the threshold value of the resource-related measurement parameter in the assistance information to 0, wherein the first preset threshold, the second preset threshold, and the first preset value are values specified by a protocol, configured by a control node, pre-configured by the control node, or indicated by another user equipment.

7. The resource selection method according to claim 1, wherein performing resource selection based on at least the assistance information comprises determining the candidate resource set based on the resource sensing result or the assistance information comprising:

determining a priority value of a resource in a resource selection window by using resource priority information in the assistance information or resource priority information obtained based on the resource sensing result.

8. The resource selection method according to claim 7, wherein the determining a priority value of a resource in a resource selection window by using resource priority information in the assistance information or resource priority information obtained based on the resource sensing result comprises:

determining a priority value X of a resource in the resource selection window by using any of the following formulas:

$$X=c*X1+d*X2;$$

$$X=\min(X1,X2); \text{ or}$$

$$X=\max(X1,X2), \text{ wherein}$$

X1 is the resource priority information obtained based on the resource sensing result, X2 is the resource priority information in the assistance information, and c and d are values specified by a protocol, configured by a control node, pre-configured by the control node, or indicated by another user equipment.

9. The resource selection method according to claim 7, wherein when the resource priority information in the assistance information is greater than a third preset threshold, a value of the resource priority information in the assistance information is adjusted to a second preset value; and when the resource priority information in the assistance information is less than a fourth preset threshold, a value of the resource priority information in the assistance information is adjusted to 0, wherein the third preset threshold, the fourth preset threshold, and the second preset value are values specified by a protocol, configured by a control node, pre-configured by the control node, or indicated by another user equipment.

10. The resource selection method according to claim 1, wherein performing resource selection based on at least the assistance information comprises determining the candidate resource set based on the resource sensing result or the assistance information comprising:

determining a measurement value threshold of a candidate resource based on assistance information notified by the receive user equipment, and determining the candidate resource set based on the measurement value threshold.

11. The resource selection method according to claim 10, wherein the measurement value threshold comprises the threshold value of the resource-related measurement parameter in the assistance information or is determined based on the assistance information.

12. The resource selection method according to claim 1, wherein performing resource selection based on at least the assistance information further comprises:

obtaining or creating at least one sidelink grant based on the assistance information, wherein the sidelink grant comprises one or a group of sidelink transmission resources, wherein a value, a maximum value, or a minimum value of the number N of the sidelink grants is a value specified by a protocol, configured by a control node, pre-configured by the control node, or indicated by another user equipment, and N is a positive integer.

13. The resource selection method according to claim 12, further comprising:

indicating a selected resource of the sidelink grant to another user equipment in a resource reservation manner.

14. The resource selection method according to claim 12, wherein after the obtaining or creating at least one sidelink grant based on the assistance information, the method further comprises:

selecting a resource used for sidelink transmission from resources of the at least one sidelink grant based on any one of the following, or selecting a sidelink grant used for sidelink transmission from the at least one sidelink grant:

a transmission time;

a location of the transmit user equipment; or an identifier of the transmit user equipment.

15. The resource selection method according to claim 12, wherein one resource set is divided into, configured, or pre-configured as a resource of the sidelink grant in a preset mode.

16. The resource selection method according to claim 1, wherein performing resource selection based on at least the assistance information further comprises:

performing resource selection based on at least one piece of the assistance information, further comprising at least one of the following:

obtaining at least one piece of assistance information notified by groupcast receive user equipments; or obtaining at least one piece of assistance information notified by a proximity user equipment.

17. The resource selection method according to claim 16, wherein the performing resource selection based on at least one piece of the assistance information comprises:

receiving M resource sets notified by another node;

determining a second weight of the resource based on a first weight of the resource in the M resource sets; or performing resource selection based on the second weight of the resource.

18. The resource selection method according to claim 16, wherein the assistance information further comprises at least one of the following:

a source or a type of the assistance information;

a timestamp of the assistance information;

a validity period of the assistance information;

location information of user equipment sending the assistance information;

a moving speed of user equipment sending the assistance information; or a moving direction of user equipment sending the assistance information.

19. A transmit user equipment, comprising:

a memory storing computer-readable instructions; and a processor coupled to the memory and configured to perform the computer-readable instructions, wherein the computer-readable instructions, when executed by the processor, cause the processor to perform operations comprising:

obtaining assistance information from a plurality of user equipments; and performing resource selection based on at least the assistance information comprises:

performing resource selection for unicast transmission to a receiving user equipment based on:

a candidate resource set, and an assistance resource set indicated by the assistance information received from the receiving user equipment, wherein among the assistance information obtained from the plurality of user equipments, only the assistance information transmitted by the receiving user equipment is used for the resource selection, wherein the assistance resource set indicated by the assistance information is a resource set preferred by the receiving user equipment, wherein the candidate resource set is determined by the transmit user equipment according to a resource sensing result.

20. A non-transitory computer-readable medium storing an instruction that, when executed by a processor of a transmit user equipment, cause the processor to perform operations comprising:

obtaining assistance information from a plurality of user equipments; and performing resource selection based on at least the assistance information comprises:

performing resource selection for unicast transmission to a receiving user equipment based on:

a candidate resource set, and an assistance resource set indicated by the assistance information received from the receiving user equipment, wherein among the assistance information obtained from the plurality of user equipments, only the assistance information transmitted by the receiving user equipment is used for the resource selection, wherein the assistance resource set indicated by the assistance information is a resource set preferred by the receiving user equipment, wherein the candidate resource set is determined by the transmit user equipment according to a resource sensing result.

* * * * *